(12) United States Patent
Yoneda et al.

(10) Patent No.: US 7,405,244 B2
(45) Date of Patent: Jul. 29, 2008

(54) SOLVENT-FREE POLYIMIDE SILICONE RESIN COMPOSITION AND A RESIN FILM COMPOSED OF THE SAME

(75) Inventors: Yoshinori Yoneda, Annaka (JP); Michihiro Sugo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 476 days.

(21) Appl. No.: 11/111,809

(22) Filed: Apr. 22, 2005

(65) Prior Publication Data

US 2006/0084714 A1    Apr. 20, 2006

(30) Foreign Application Priority Data

Apr. 22, 2004  (JP)  ............... 2004-127024
Apr. 20, 2005  (JP)  ............... 2005-122570

(51) Int. Cl.
C08L 79/08    (2006.01)
C08J 3/28     (2006.01)

(52) U.S. Cl. ............... 522/42; 522/43; 522/44; 522/46; 522/63; 522/141; 522/142; 428/209

(58) Field of Classification Search ............... 522/148, 522/141, 142, 42, 43, 46, 68, 44, 63
See application file for complete search history.

(56) References Cited

U.S. PATENT DOCUMENTS

| | | | | |
|---|---|---|---|---|
| 4,017,340 A | * | 4/1977 | Yerman | 148/33.3 |
| 5,317,049 A | * | 5/1994 | Rojstaczer et al. | 524/104 |
| 6,214,923 B1 | * | 4/2001 | Goto et al. | 524/514 |
| 7,141,614 B2 | * | 11/2006 | Okada et al. | 522/46 |
| 2006/0052476 A1 | * | 3/2006 | Yoneda et al. | 522/99 |

FOREIGN PATENT DOCUMENTS

JP     2002-332305 A    11/2002

OTHER PUBLICATIONS

Machine Translation from PAT website for JP Publication 2002-332305, Nov. 2002.*

* cited by examiner

*Primary Examiner*—Susan W Berman
(74) *Attorney, Agent, or Firm*—Birch, Stewart, Kolasch & Birch, LLP (57) ABSTRACT

A solvent-free resin composition comprising
(a) a polyimide silicone resin having repeating units represented by the following general formulas (1-1) and (1-2),

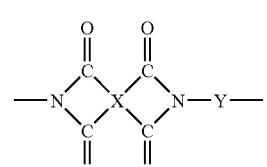

(1-1)

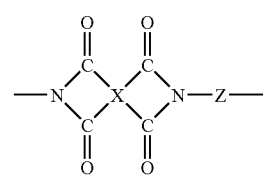

(1-2)

wherein X is a tetravalent organic group, Y is a divalent organic group, and Z is a divalent organic group having an organosiloxane moiety,
(b) a reactive diluent, and
(c) a photo-polymerization initiator,
characterized in that a film of said resin composition with a film thickness of 100 μm prepared on a quartz glass substrate shows a light transmittance of 80% or higher at wavelengths of from 350 nm to 450 nm.

10 Claims, 2 Drawing Sheets

Transmittance spectrum of the compound from Preparation Example 1

Fig. 1 Transmittance spectrum of the compound from Preparation Example 1

Fig. 2 Transmittance spectrum of the compound from Preparation Example 4

SOLVENT-FREE POLYIMIDE SILICONE RESIN COMPOSITION AND A RESIN FILM COMPOSED OF THE SAME

CROSS REFERENCES

This application claims the benefits of Japanese Patent application No. 2004-127024 filed on Apr. 22, 2004, and Japanese Patent application No. 2005-122570 filed on Apr. 20, 2005, the contents of which are hereby incorporated by reference.

FIELD OF THE TECHNOLOGY

This invention relates to a polyimide silicone resin composition, which resin composition is substantially free of solvent and useful as a coating material and an adhesive, and to a resin film obtained by curing the same.

BACKGROUND OF THE INVENTION

In general, polyimide resins have high heat resistance and good electrical insulation, and find use in printed circuit boards and heat resistant adhesive tapes. They are also used as resin varnish to form surface protective films and interlayer insulating films for electric parts and semiconductor materials. Polyimide resins, however, are soluble only in a limited number of solvents. Accordingly, it is a common practice to coat the substrate with a solution of polyamic acid which is a precursor for polyimide and relatively soluble in various solvents, and then to treat the coating at an elevated temperature to effect dehydration and cyclization into a polyimide resin.

Meanwhile, for the purpose of improving the solubility of polyimide resins in solvents, enhancing the adhesion thereof to substrates, and imparting flexibility thereto, an attempt has been made to introduce siloxane chains into polyimide skeletons. However also in these cases, the polyimide resin has to be generally diluted with solvent for use. This necessitates a step to remove the solvent, such as a heating step, after the polyimide resin solution is applied or coated to substrates. Further, measures for working environment, such as ventilation, are also required.

PRIOR ART

A solvent-free polyimide silicone resin composition is described in Patent Literature 1, wherein a polyimide silicone resin composition is premixed with a (meth)acrylic compound as a reactive diluting compound, whereby it is possible to attain high adhesion to a substrate with various shapes and to eliminate the solvent removal step after coating work, such as application. However, when this resin composition is used for parts where a thick coating is required, such a drawback appears that the resin composition is not cured enough. This is because the polyimide silicone resin has a color and, therefore, irradiation light does not reach deep enough to complete the curing in photo-curing.

[Patent Literature 1]
  Japanese Patent Laid-open Application No. 2002-332305

SUMMARY OF THE INVENTION

The present invention has been made in view of the above-mentioned situation, and an object of the invention is to provide a polyimide silicone resin composition, wherein the composition is substantially free of solvent, which enables elimination of the solvent removal step in coating work, has high adhesion to substrates of various shapes, and is capable of providing a desired film thickness. The present invention also provides a cured film obtained by curing the composition. An electronic part in which the aforementioned cured film is used is also an object of the present invention. The present cured film can be used in printed circuit boards or heat resistant tape in electric parts, and also used as a surface protective film or an interlayer insulation film in electric parts or semi-conductor material.

As a result of extensive researches to accomplish the above-described objects, the inventors have found that a reactive diluent gives a solvent-free polyimide silicone resin composition that attains high adhesion to substrates with various shapes and eliminates a solvent removal step after work such as application, and that a desired thickness of a coating is allowed by making a color of the polyimide silicone resin lighter and thus have reached the present invention.

As a result the extensive researches to accomplish the above objects, the inventors have found that the above objects can be attained by introducing a specific structure into the polyimide resin. Thus, the present invention provides a solvent-free resin composition and a resin film composed of the same, wherein the solvent-free resin composition comprises (a) a polyimide silicone resin having repeating units represented by the following general formulas (1-1) and (1-2), wherein X is a tetravalent organic group, Y is a divalent organic group, and Z is a divalent organic group having an organosiloxane moiety,

(b) a reactive diluent, and
(c) a photo-polymerization initiator, characterized in that a film of said resin composition with a film thickness of 100 μm prepared on a quartz glass substrate shows a light transmittance of 80% or higher at wavelengths of from 350 nm to 450 nm.

X in the general formula (1-1) and (1-2) is preferably a group represented by general formula (2), (3), (4) or (5)

-continued

Preferably, Z in the general formula (1-2) is present in an amount of 30 mass % or more in the polyimide silicone resin, and Z is a diamine residue represented by the general formula (6), wherein $R^1$, $R^2$, $R^3$, and $R^4$, which may be the same or different, are each substituted or unsubstituted monovalent hydrocarbon group having 1 to 8 carbon atoms, and "a" is an integer of from 1 to 100.

The reactive diluent is preferably a (meth)acrylic compound.

The photo-polymerization initiator is preferably selected from the group consisting of acetophenone derivatives, benzophenone derivatives, benzoin ether derivatives, and xanthone derivatives.

The polyimide silicone resin composition of the present invention comprises a reactive diluent together with a polyimide silicone resin, and is substantially free of solvent. Therefore, the step of solvent removal can be eliminated. The composition can provide high adhesion to substrates of various shapes. The polyimide silicone resin does not interfere with curing of the reactive diluent, so that a desired thickness of a coating can be obtained.

DESCRIPTION OF THE PREFERRED EMBODIMENTS

The present invention will be elucidated in detail.

The polyimide silicone resin having the unit of formulas (1-1) and (1-2) according to the present invention can be obtained by reacting acid dianhydride with diamine and diaminosiloxane.

The polyimide silicone resin used in the present invention is characterized in that it does not absorb light so much as to prevent the polymerization initiator from absorbing light. It is preferred that a raw material, dianhydride of tetracarboxylic acid, has little absorption in the ultraviolet to visible light region and that the acid does not tend to form a charge transfer complex after imidization.

Aliphatic and alicyclic tetracarboxylic dianhydrides are preferred in terms of less light absorption. Examples of the aliphatic tetracarboxylic dianhydrides include butane-1,2,3, 4-tetracarboxylic dianhydride and pentane-1,2,4,5-tetracarboxylic dianhydride. Examples of the alicyclic tetracarboxylic dianhydrides include cyclobutane-1,2,3,4-tetracarboxylic dianhydride, cyclohexane-1,2,4,5-tetracarboxylic dianhydride, dicyclohexyl-3,4,3',4'-tetracarboxylic dianhydride, bicyclo[2.2.1]heptane-2,3,5,6-tetracarboxylic dianhydride, 2,3,4,5-tetrahydrofurantetracarboxylic dianhydride, and bicyclo[2.2.2]oct-7-ene-2,3,5,6-tetracarboxylic dianhydride.

Use may also be made of aliphatic tetracarboxylic dianhydrides having an aromatic ring, such as 1,3,3a,4,5,9b-hexahydro-5-(tetrahydro-2,5-dioxo-3-furanyl)-naphtho[1,2-c]furan-1,3-dione, and 1,3,3a,4,5,9b-hexahydro-5-methyl-5-(tetrahydro-2,5-dioxo-3-furanyl)-naphtho[1,2-c]furan-1,3-dione. Aromatic tetracarboxylic dianhydrides which have superior heat resistance may be also used as far as they do not prevent photo-polymerization initiator from absorbing light. Examples of the aromatic tetracarboxylic dianhydrides include pyromellitic dianhydride, 3,3',4,4'-benzophenonetetracarboxylic dianhydride, 3,3',4,4'-diphenyl ether tetracarboxylic dianhydride, 4,4'-hexafluoropropylidenebisphthalic dianhydride, and 3,3',4,4'-diphenylsulfone tetracarboxylic dianhydride. These tetracarboxylic dianydrides may be used alone or in combination of two or more of the acid dianhydrides.

For the diamine, preference is given to diamines that cause less light absoprtion in the ultraviolet to visible light region and do not tend to form a charge transfer complex after imidation. Aliphatic diamines are preferred in terms of less light absorption. However, aromatic diamines which have superior heat resistance also may be used as far as they do not prevent the photo-polymerization initiator from absorbing light. Examples of the aliphatic diamines include tetrametylenediamine, 1,4-diaminocyclohexane, and 4,4'-diaminodicyclohexylmetahne; and examples of the aromatic diamines include phenylenediamine, 4,4'-diaminodiphenylether, and 2,2-bis(4-aminophenyl)propane. These may be used alone or in combination of two or more of the diamines.

As the diaminosiloxane residue, those represented by the general formula (6) may be used in the present invention.

$R^1$, $R^2$, $R^3$, and $R^4$ in the formula are substituted or unsubstituted monovalent hydrocarbon groups having 1 to 8 carbon atoms, such as alkyl groups e.g. methyl, ethyl, propyl, butyl, pentyl, and hexyl groups; cycloalkyl groups such as cyclopentyl and cyclohexyl groups; aryl groups such as phenyl and xylyl groups; aralkyl groups such as benzyl and phenetyl groups; halogenated alkyl groups such as 3,3,3-trifluoropropyl and 3-chloropropyl groups; trialkoxysilylalkyl groups such as 2-(trimethoxysilyl)ethyl group; alkoxy groups such as methoxy, ethoxy, and propoxy groups; aryloxy groups such as phenoxy group; and a cyano group. Among these, methyl, ethyl and phenyl groups are preferred. In the formula (6), "a" is an integer of from 1 to 100.

The organosiloxane moiety, Z, is present preferably in an amount of 30 mass % or more, more preferably 40 mass % or more, in the polyimide silicone resin having the units of formulas (1-1) and (1-2). If it is present in amount less than 30 mass %, the resulting polyimide silicone resin is less soluble in a diluent and does not show flowability at a temperature of 25 degrees C. An upper limit may be selected as required, and may preferably be 90 mass %, particularly 80 mass %. Accordingly, a molar amount of the unit (1-1), p, and a molar amount of the unit (1-2), q, are preferably selected so that the amount of the oranosiloxane moiety in the polyimide silicone resin would be in the aforesaid range, and that q/(p+q) is in the range of from 0.1 to 0.95, particularly from 0.2 to 0.85.

A weight average molecular weight of the polyimide silicone resin is preferably in the range of from 5,000 to 100,000, particularly 10,000 to 700,000. If the molecular weight is less than 5,000, the film obtained by curing the polyimide silicone resin composition is fragile. Meanwhile, if the molecular weight exceeds 100,000, the compatibility with the acrylic compounds is worse.

The polyimide silicone resin may be prepared according to a known method; first, acid dianhydride, diamine, and diaminopolysiloxane are put in a solvent and the mixture is reacted at a low temperature, such as a temperature between 20 and 50 degrees C., to obtain polyamic acid, a precursor for a polyimide resin. Then the solution of the resulting polyamic acid is heated preferably to a temperature of from 80 to 200 degrees C., particularly from 140 to 180 degrees C., to cause a dehydration and ring-closure reaction of an acid amide of the polyamic acid to yield a polyimide silicone resin solution. This solution is poured into a solvent, such as water, methanol, ethanol, or acetonitrile, to thereby cause precipitation. The precipitates are dried to obtain the polyimide silicone resin.

The molar ratio of the combined amounts of the diamine and the diaminopolysiloxane to the tetracarboxylic dianhydride may properly be determined depending on a molecular weight of a polyimide silicone resin to be prepared, and may be in the range of from 0.95 to 1.05, preferably from 0.98 to 1.02. As the solvent to be used in the preparation of the polyimide silicone resin, mention may be made of N-methyl-2-pyrrolidone, cyclohexanone, gamma-butyrolactone and N,N-dimethylacetamide. It is also possible to use aromatic hydrocarbons such as toluene and xylene in addition to the aforesaid solvents in order to facilitate the azeotropic removal of the resulting water in the course of imidization. These solvents may be used alone or in combination of two or more of the solvents.

In order to control the molecular weight of the polyimide silicone resin, a mono-functional compound such as phthalic anhydride or aniline may be added as a raw material to the reaction mixture. The mono-functional compound may be added preferably in an amount of less than 2 mol % relative to the polyimide silicone resin.

Imidization may be carried out using a dehydrating agent and an imidization catalyst in the imidization step. The reaction mixture is heated to approximately 50 degrees C., if necessary. In this method, acid anhydride may be used, such as acetic anhydride, propionic anhydride, or trifluoroacetic anhydride as the dehydrating agent. The dehydrating agent may be used preferably in an amount of from 1 to 10 moles per mole of diamine. As the imidization catalyst, tertiary amines may be used, such as pyridine, collidine, lutidine, or triethylamine. The imidization catalyst may be used preferably in amount of from 0.5 to 10 moles per mole of the dehydrating agent used. This imidization method is beneficial because the reaction solution is not exposed to a high temperature and, accordingly, the resulting resin is less discolored.

If a plurality of the diamines or the tetracarboxylic dianhydrides, or both, are used, the reaction method is not particularly limited. For instance, all of the raw materials may be mixed together and then subjected to condensation copolymerization. Alternatively, two or more of the diamines or tetracarboxylic dianhydrides may be added separately one after another to react.

The thus-prepared polyimide silicone resin of the present invention is characterized in that the film thereof prepared on a quartz glass substrate in a thickness of 100 μm shows a light transmittance of 80% or higher at wavelengths of from 350 nm to 450 nm in ultraviolet-visible light absorption spectrometry.

The reactive diluent contained in the polyimide silicone resin composition may be any reactive diluent that reacts with aid of the photo-polymerization initiator described below. (Meth)acrylic compounds and vinyl ether compounds are generally known. The (meth)acrylic compounds are preferred because of their versatility and variety. The (meth)acrylic compounds refer to acrylates, methacrylates, acrylic amides, and methacrylic amides which can dissolve the aforementioned polyimide silicone resin.

As the (meth)acrylic compounds used in the present invention, the (meth)acrylates represented by the following general formula (7) or the (meth)acrylic amides represented by the following general formula (8) are preferred, $$CH_2=CR^3COOR^2 \qquad (7)$$

$$CH_2=CR^3CONR^2{}_2 \qquad (8),$$

wherein $R^2$ represents an alkyl group, preferably having 1 to 20 carbon atoms, more preferably from 1 to 10 carbon atoms, and $R^3$ preferably represents a hydrogen atom or a methyl group.

Illustrative examples of the acrylates (7) include methyl acrylate, ethyl acrylate, isobutyl acrylate and isobornyl acrylate. Illustrative examples of the acrylic amides (8) are N,N-dimethylacrylamide and N,N-diethylacrylamide.

Examples of the methacrylic compounds, where $R^3$ in the general formulas (7) and (8) is a methyl group, include methyl methacrylate, ethyl methacrylate, isobutyl methacrylate, isobornyl methacrylate, glycidyl methacrylate, 3,4-epoxycyclohexylmethyl methacrylate, 2-hydroxyethyl methacrylate, 2-hydroxypropyl methacrylate, 2-hydroxybutyl methacrylate, trifluoropropyl methacrylate, perfluoro-butylethyl methacrylate, perfluorooctylethyl methacrylate, and methacryl group-containing organopolysiloxanes.

For enhancing adhesion to substrates and improving physical properties, other compounds may also be used, such as vinyl compounds, for instance, N-vinylpyrrolidone; epoxy group-containing acrylic compounds such as glycidyl acrylate and 3,4-epoxycyclohexylmethyl acrylate; hydroxyl-containing acrylic compounds such as 2-hydroxyethyl acrylate, 2-hydroxypropyl acrylate and 2-hydroxybutyl acrylate; fluorinated alkyl acrylic compounds such as trifluoropropyl acrylate, perfluorobutyl ethyl acrylate and perfluorooctyl ethyl acrylate; and acryl group-containing organopolysiloxanes.

These compounds may be used alone or in combination of two or more of them.

Especially, the (meth)acryl group-containing alkoxysilane as (b) sometimes works for suppressing turbidity of the cured film after photo-irradiation. Specific examples include acrylic silanes such as acryloxypropyltrimethoxysilane and acryloxypropylmethyldimethoxysilane; and methacrylic silanes such as methacryloxypropyltrimethoxysilane and methacryloxypropylmethyldimethoxysilane. The (meth) acryl group-containing alkoxysilane is preferably present in an amount of from 0 to 200 parts by mass, more preferably from 0 to 100 parts by mass, relative to 100 parts by mass of the polyimide silicone resin (a).

Besides the mono(meth)acrylates, di(meth)acrylates or polyfunctional (meth)acrylates may be added as (b) for the purpose of improving strength and adhesion.

The composition of the present invention comprises a photo-polymerization initiator. The photo-polymerization initiators selected from acetophenone derivatives, benzophenone derivatives, benzoin ether derivatives, and xanthone derivatives are preferred for productivity and fast curing.

Specific examples include diethoxyacetophenon, 2-hydroxy-2-methyl-1-phenylpropan-1-one, 2,2-dimethoxy-2-phenylacetophenon, 1-hydroxycyclohexyl phenyl ketone, isobutylbenzoin ether, benzoin methyl ether, thioxanthone, isopropyl thioxanthone, 2-methyl-1-[4-(methylthio)phenyl]-2-morphorinopropane-1-one, and 2-benzyl-2-dimethylamino-1-(4-morphorinophenyl)-butanone-1.

The aforementioned polyimide silicone resin, the reactive diluent, and the photo-polymerization initiator may be used in any proportion. The preferred proportion is 100 parts by mass of the polyimide silicone resin (a), 20 to 2000 parts by mass of the reactive diluent (b), and 1 to 200 parts by mass of the polymerization initiator (c). More preferably, the proportion is 100 parts by mass of the polyimide silicone resin (a), 30 to 1000 parts by mass of the reactive diluent (b), and 2 to 100 parts by mass of the polymerization initiator (c).

In a practical use of the polyimide silicone resin composition of the invention, it is possible to cure the polyimide silicone resin composition in a solid state, such as a film, but the composition is preferably flowable at 25 degrees C. for easier handling. Specifically, it preferably has a viscosity of 10,000 Pa·s or lower at 25 degrees C., more preferably from 0.01 to 5,000 Pa·s, even more preferably from 0.1 to 1,000 Pa·s.

The present polyimide silicone resin composition can be applied on any substrate, for instance, metals such as iron, copper, nickel, or aluminum; inorganic substrates such as glass; and organic resins such as epoxy resins or acrylic resins.

For eliminating the drawback of polyimide silicone varnishes of the prior art that it needs dilution by a solvent, use is made of the reactive (meth)acrylic compound as the diluent in the polyimide silicone resin composition of the invention to provide a substantially solvent-free polyimide silicone varnish. The polyimide silicone resin in the invention does not prevent the photo-polymerization of the reactive diluent, so that the polyimide silicone composition cures readily upon exposure to light or to form a polyimide silicone/(meth) acrylic resin film of a desired thickness. Accordingly the present composition is advantageously used as an adhesive or coating material for devices, such as electric and electronic devices, and semiconductor chips where high reliability is required.

The present invention will be elucidated wit reference to the Examples, but not limited thereto.

EXAMPLES

Preparation Example 1

In a flask provided with a stirrer, a thermometer, and nitrogen purge equipment were fed 30.0 g (0.1 mole) of 1,3,3a,4,5,9b-hexahydro-5-(tetrahydro-2,5-dioxo-3-furanyl)-naphtho[1,2-c]furan-1,3-dione, 250 g of N,N-dimethylacetamide, and 100 g of toluene. Subsequently, in the above flask was added 12.6 g (0.025 mole) of 2,2'-[2-hydroxy-3-(3,5-dimethyl-4-amino)-benzyl-5-methyl]-diphenylmethane. The reaction mixture was kept at 50 degrees C. for 3 hours. Then, 68.6 g (0.075 mole) of diaminosiloxane, with "a" of the general formula (6) being 10 on average was added dropwise at room temperature. After the addition, the reaction mixture was stirred at room temperature for 12 hours.

Then, a reflux condenser provided with a water receptor was attached to the flask and, 20.4 g of acetic anhydride and 26.4 g of pyridine were added. The reaction mixture was heated to 50 degrees C. and kept at that temperature for 3 hours.

The solution thus obtained was poured into methanol, poor solvent, to thereby cause reprecipitation of the resin. A polyimide silicone resin with 62 mass % of siloxane was obtained. The infrared absorption spectrum of this resin did not show peaks of the polyamic acid, which peaks indicate the presence of unreacted functional groups, but the absorption bands of an imide group were observed at $1780\text{ cm}^{-1}$ and $1720\text{ cm}^{-1}$. The resin obtained had the structure represented by the following formula, wherein X is

Y is and Z is

Figure 1:
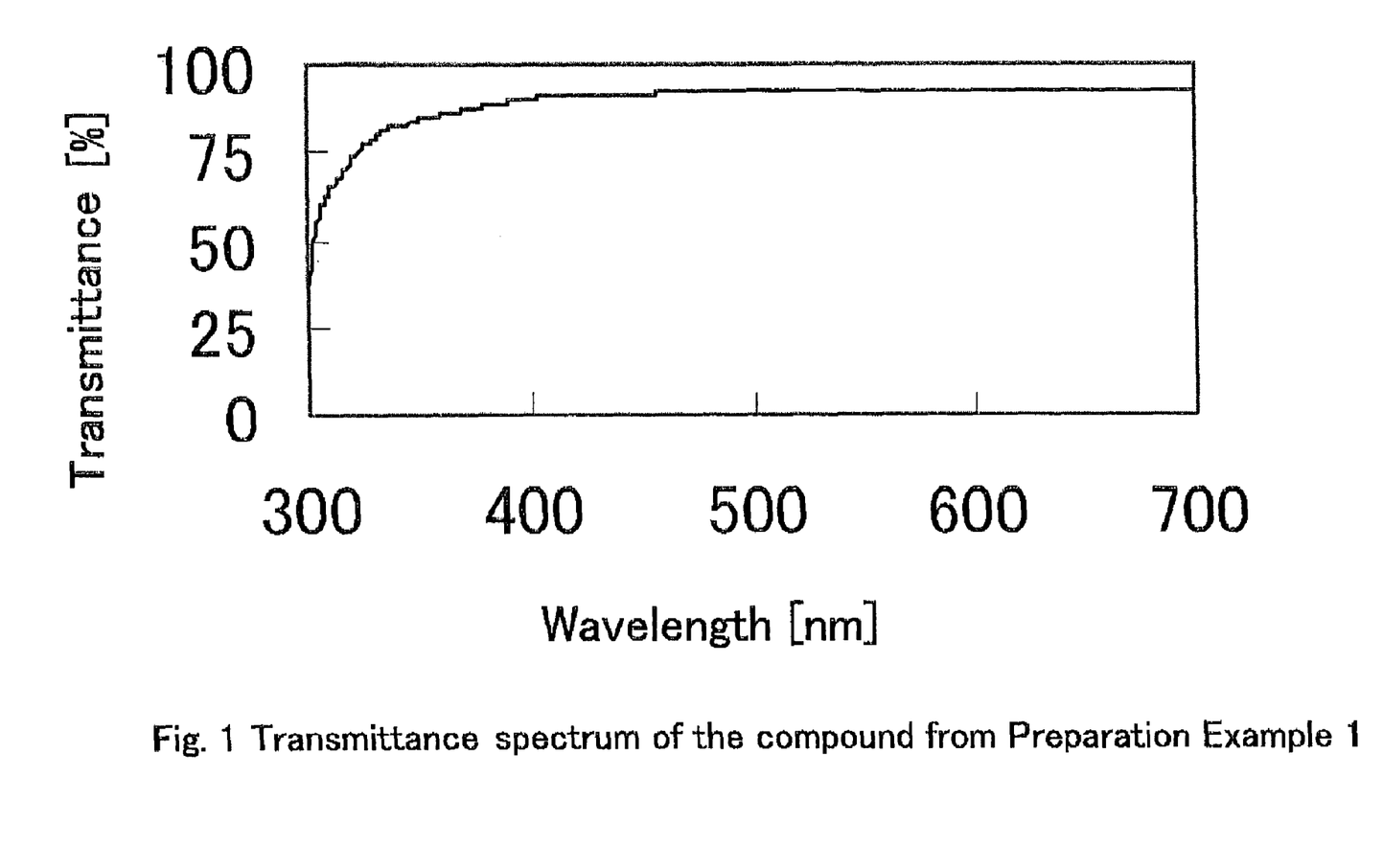
FIG. 1 shows the transmittance spectrum of the polyimide silicone prepared in Preparation Example 1.

A weight average molecular weight of the resin, reduced to polystyrene, was 24,000, as determined by gel permeation chromatography (GPC) using tetrahydrofuran as a solvent. A film with a thickness of 100 μm was prepared on a quartz glass substrate to determine the light transmittance. The light transmittance at wavelengths of from 350 nm to 450 nm was 80% or higher. The absorption spectrum of this film is represented in FIG. 1.

Preparation Example 2

To a flask provided with a stirrer, a thermometer, and nitrogen purge equipment were added 30.0 g (0.1 mole) of 1,3,3a,4,5,9b-hexahydro-5-(tetrahydro-2,5-dioxo-3-furanyl)-naphtho[1,2-c]furan-1,3-dione, 250 g of N,N-dimethylacetamide and 100 g of toluene. Subsequently to the above flask was added 29.6 g (0.06 mole) of 2,2'-[2-hydroxy-3-(3,5-dimethyl-4-amino)-benzyl-5-methyl]-diphenylmethan. The reaction mixture was kept at 50 degrees C. for 3 hours. Then, 36.6 g (0.04 mole) of diaminosiloxane, with "a" of the general formula (6) being 10 on average was added dropwise at room temperature. After the addition was completed, the reaction mixture was stirred at room temperature for 12 hours.

Then, a reflux condenser provided with a water receptor was attached to the flask and 20.4 g of acetic anhydride and 26.4 g of pyridine were added. The reaction mixture was heated to 50 degrees C. and kept at that temperature for 3 hours.

The solution thus obtained was poured into methanol, poor solvent, to thereby cause the resin to reprecipitate. The polyimide silicone resin with 38 mass % of siloxane was obtained. The infrared absorption spectrum of the resin did not show peaks of the polyamic acid, which peaks indicate the presence of unreacted functional groups, but the absorption bands of an imide group were observed at 1780 cm$^{-1}$ and 1720 cm$^{-1}$. The resin obtained had the structure represented by the following formula, wherein X is

Y is and Z is

A weight average molecular weight of the resin, reduced to polystyrene, was 20,000, as determined by gel permeation chromatography (GPC) using tetrahydrofuran as a solvent. A film with a thickness of 100 μm was prepared on a quartz glass substrate to determine the light transmittance. The transmittance at wavelengths of from 350 nm to 450 nm was 80% or higher.

Preparation Example 3

To a flask provided with a stirrer, a thermometer, and nitrogen purge equipment were added 19.6 g (0.1 mole) of 1,2,3,4-cyclobutanetetracarboxylic dianhydride, 250 g of N,N-dimethylacetamide, and 100 g of toluene. Subsequently to the above flask, 12.6 g (0.025 mole) of 2,2'-{2-hydroxy-3-(3,5-dimethyl-4-amino)-benzyl-5-methyl}-diphenylmethane was added. The reaction mixture was kept at 50 degrees C. for 3 hours. Then, 68.6 g (0.075 mole) of diaminosiloxane, with "a" of the general formula (6) being 10 on average was added dropwise at room temperature. After the addition was completed, the reaction mixture was stirred at room temperature for 12 hours.

Then, a reflux condenser provided with a water receptor was attached to the flask and 20.4 g of acetic anhydride and 26.4 g of pyridine were added. The reaction mixture was heated to 50 degrees C. and kept at that temperature for 3 hours.

The solution thus obtained was poured into methanol, a poor solvent, to thereby cause the resin to reprecipitate. The polyimide silicone resin with 68 mass % of siloxane was obtained. The infrared absorption spectrum of this resin did not show peaks of the polyamic acid, which peaks indicate the presence of unreacted functional groups, but the absorption bands of an imide group were observed at 1780 cm$^{-1}$ and 1720 cm$^{-}$. The resin obtained had the structure represented by the following formula, wherein X is

Y is and Z is

A weight average molecular weight of the resin, reduced to polystyrene, was 22,000, as determined by gel permeation chromatography (GPC) using tetrahydrofuran as a solvent. A film with a thickness 100 μm was prepared on a quartz glass substrate to determine the light transmittance. The film had a transmittance of 80% or higher at wavelengths of from 350 nm to 450 nm.

Preparation Example 4

To a flask provided with a stirrer, a thermometer, and nitrogen purge equipment were added 59.7 g (0.167 mole) of 3,3',4,4'diphenylsulfone tetracarboxylic dianhydride and 400 g of chyclohexanone. Then, a solution of 121.6 g (0.133 mole) of diaminosiloxane, with "a" of the general formula (6) being 10 on average and 14.4 g (0.033 mole) of bis[4-(3-aminophenoxy)phenyl]sulfone in 50 g of cyclohexanone was added dropwise to the above flask while the temperature of the reaction mixture was kept below 50 degrees C. After the addition was completed, the reaction mixture was stirred at room temperature for 10 hours.

Subsequently, a reflux condenser provided with a water receptor was attached to the flask and 40.8 g of acetic anhydride and 52.8 g of pyridine were added. The reaction mixture was heated to 50 degrees C., and kept at that temperature for 3 hours.

The solution thus obtained was poured into methanol, poor solvent, to thereby cause the resin to reprecipitate and the resulting precipitates were dried. The polyimide silicone resin with 61 mass % of siloxane was obtained.

The infrared absorption spectrum of this resin did not showed peaks of the polyamic acid, which peaks indicate the presence of unreacted functional groups, but the absorption bands of an imide group were observed at 1780 cm$^{-1}$ and 1720 cm$^{-1}$. The resin obtained had the structure represented by the following formula, wherein X is

Y is and Z is

A weight average molecular weight of the resin, reduced to polystyrene, was 30,000, as determined by gel permeation chromatography (GPC) using tetrahydrofuran as a solvent.

Figure 2:
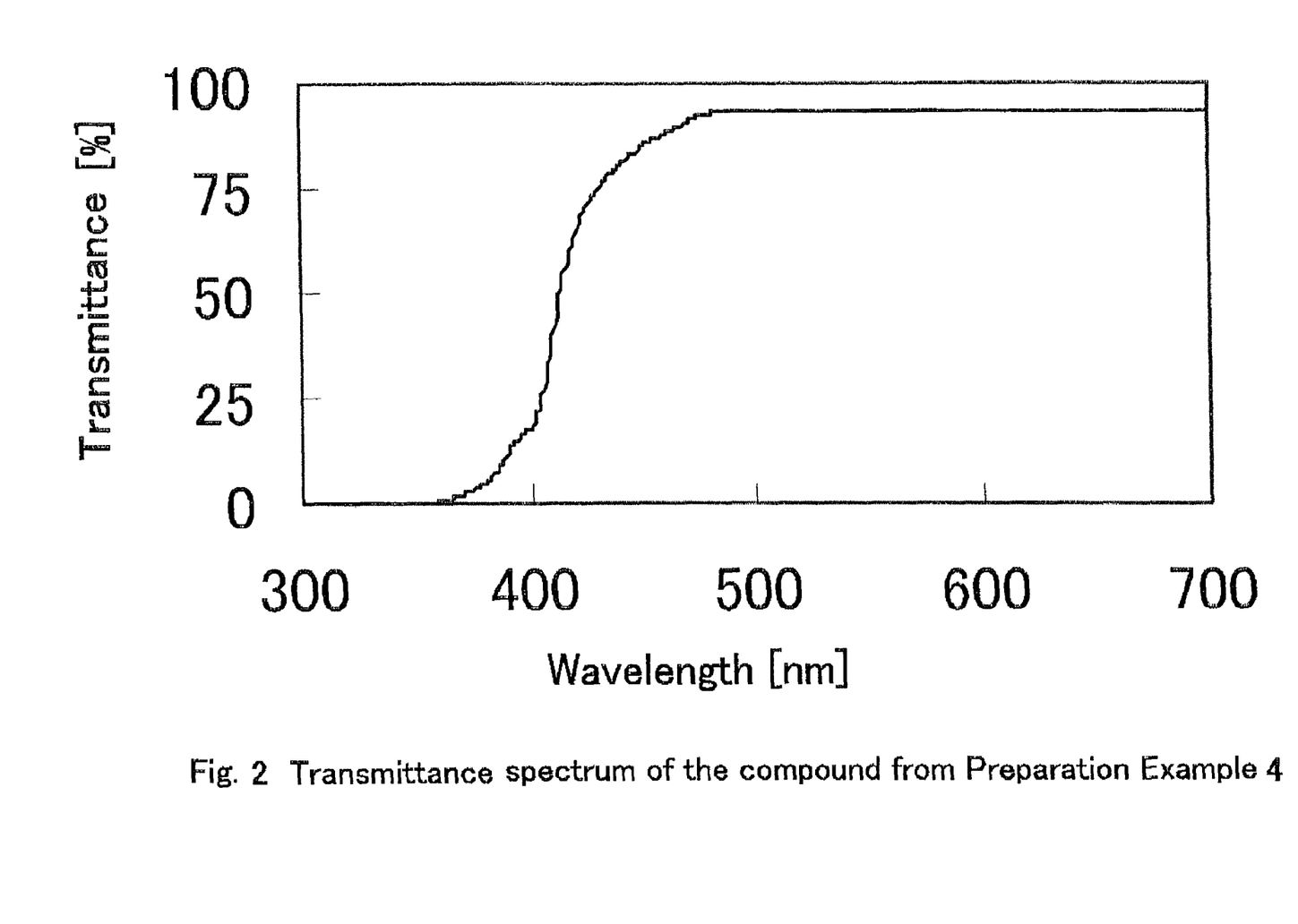
FIG. 2 shows the transmittance spectrum of the polyimide silicone prepared in Preparation Example 4.

A film with thickness of 100 μm was prepared on a quartz glass substrate to determine the light transmittance. The film showed a light transmittance less than 80% at wavelengths of from 350 nm to 450 nm. The absorption spectrum of this film is shown in FIG. 2.

Example 1

50 g of the polyimide silicone resin prepared in Preparation Example 1, 100 g of ethyl acrylate, 5 g of acryloxypropylmethoxysilane, and 5 g of 2,2-dimethoxy-2-phenylacetophenone were combined and stirred in a flask to obtain a polyimide silicone resin composition. This composition had a viscosity of 9 Pa·s. A cured film of the polyimide silicone resin composition was evaluated for adhesion by the crosshatch peel test. The results are shown in Table 1. The crosshatch peel test is as follows.

Crosshatch Peel Test

A polyimide silicone resin composition was applied on a glass plate in a film thickness of 1 mm and then subjected to UV irradiation using a high-pressure mercury lamp, with the integrated exposure being 1000 mJ/m$^2$, to obtain a cured film. This film was exposed to hot and humid conditions of 80 degrees C. and 95% of RH for 24 hours. The adhesion properties to the glass plate before and after the exposure were evaluated according to the crosshatch peel test, JIS K5400.

Example 2

50 g of the polyimide silicone resin prepared in Preparation Example 1, 50 g of ethyl acrylate, and 5 g of 2-hydroxy-2-methyl-1-phenylpropan-1-one were combined and stirred in a flask to obtain a polyimide silicone resin composition. This composition had a viscosity of 80 Pa·s. A cured film of the polyimide silicone resin composition was evaluated for adhesion by the crosshatch peel test. The results are shown in Table 1.

Example 3

50 g of the polyimide silicone resin prepared in Preparation Example 2, 100 g of ethyl acrylate, and 5 g of acryloxypropyltrimethoxysilane, and 5 g of 2-hydroxy-2-metyl-1-phenylpropan-1-one were combined and stirred in a flask to obtain a polyimide silicone resin composition. This composition had a viscosity of 180 Pa·s. The cured film of the polyimide silicone resin composition was evaluated for adhesion by the crosshatch peel test. The results are shown in Table 1.

Example 4

50 g of the polyimide silicone resin prepared in Preparation Example 3, 50 g of ethyl acrylate, and 5 g of acryloxypropyltrimethoxysilane, and 5 g of 2-hydroxy-2-metyl-1-phenylpropan-1-one were combined and stirred in a flask to obtain a polyimide silicone resin composition. This composition had a viscosity of 60 Pa·s. The cured film of the polyimide silicone resin composition was evaluated for adhesion by the crosshatch peel test. The results are shown in Table 1.

Comparative Example 1

50 g of the polyimide silicone resin prepared in Preparation Example 4, 100 g of ethyl acrylate, and 1 g of 2,2-dimethoxy-2-phenylacetophenone were combined and stirred in a flask to obtain a polyimide silicone resin composition. This composition had a viscosity of 10 Pa·s. The cured film of the polyimide silicone resin composition was evaluated for adhesion by the crosshatch peel test. The results are shown in Table 1.

TABLE 1

|  | Before exposure (No. of peeled sections/No. of tested sections) | After exposure (No. of peeled sections/No. of tested sections) |
| --- | --- | --- |
| Example 1 | 0/100 | 0/100 |
| Example 2 | 0/100 | 0/100 |
| Example 3 | 0/100 | 0/100 |
| Example 4 | 0/100 | 0/100 |
| Comparative Example 1 | 100/100 (Cure was poor near the substrate) | 100/100 (Cure was poor near the substrate) |

INDUSTRIAL APPLICABILITY

The present invention provides a polyimide silicone resin composition, which is substantially free of solvent, accordingly enables elimination of the solvent removal step after coating work, and has high adhesion to substrates of various shapes.

The cured film obtained by curing the resin composition of the present invention can be used as a material in printed circuit boards or heat resistant tape in electric parts, and also used as surface protective film and interlayer insulation film in electric parts or semi-conductor material.

What is claimed is:
1. A solvent-free resin composition comprising
  (a) a polyimide silicone resin having repeating units represented by the following general formulas (1-1) and (1-2),

(1-1)

(1-2)

wherein X is a tetravalent organic group selected from the group represented by the general formulas (2), (3), (4), or (5), Y is a divalent organic group, and Z is a divalent organic group having an organosiloxane moiety,
(b) a reactive diluent, and
(c) a photo-polymerization initiator, characterized in that a film of said resin composition with a film thickness of 100 μm prepared on a quartz glass substrate shows a light transmittance of 80% or higher at wavelengths of from 350 nm to 450 nm.

2. The solvent-free polyimide silicone resin composition according to claim 1, wherein Z is present in an amount of 30 mass % or more in said polyimide silicone resin and Z is a diamine residue represented by the general formula (6), (6)

wherein $R^1$, $R^2$, $R^3$, and $R^4$ are substituted or unsubstituted monovalent hydrocarbon groups having 1 to 8 carbon atoms and "a" is an integer of from 1 to 100.

3. The solvent-free polyimide silicone resin composition according to claim 1, wherein said reactive diluent, (b), is a (meth)acrylic compound.

4. The solvent-free polyimide silicone resin composition according to claim 1, wherein said photo-polymerization initiator, (c), is selected from the group consisting of acetophenone derivatives, benzophenone derivatives, benzoin ether derivatives, and xanthone derivatives.

5. The solvent-free polyimide silicone resin composition according to claim 1, wherein the composition comprises (a) 100 parts by mass of the polyimide silicone resin, (b) 20 to 2000 parts by mass of the reactive diluent, and (c) 1 to 200 parts by mass of the photo-polymerization initiator.

6. The solvent-free polyimide silicone resin composition according to claim 1, wherein the reactive diluent (b) is a (meth)acryl group-containing alkoxysilane which is present in an amount of from 0 to 100 parts by mass relative to 100 parts by mass of the polyimide silicone resin (a).

7. The solvent-free polyimide silicone resin composition according to claim 1, wherein the composition is flowable at 25 degrees C.

8. The solvent-free polyimide silicone resin composition according to claim 1, wherein the composition has a viscosity of 10,000 Pa·s or lower at 25 degrees C.

9. A resin film obtained by photo curing the solvent-free polyimide silicone resin according to claim 1.

10. An electronic part, comprising said resin film according to claim 9.

* * * * *